United States Patent [19]

Tauster et al.

[11] Patent Number: 5,196,390
[45] Date of Patent: Mar. 23, 1993

[54] HYDROGEN SULFIDE-SUPPRESSING CATALYST SYSTEM

[75] Inventors: Samuel Tauster, Englishtown; Joseph C. Dettling, Howell; John J. Mooney, Wyckoff, all of N.J.

[73] Assignee: Engelhard Corporation

[21] Appl. No.: 899,015

[22] Filed: Jun. 15, 1992

Related U.S. Application Data

[63] Continuation of Ser. No. 644,697, Jan. 22, 1991, abandoned, which is a continuation of Ser. No. 532,008, Jun. 1, 1990, abandoned, which is a continuation-in-part of Ser. No. 116,598, Nov. 3, 1987, Pat. No. 4,939,113.

[51] Int. Cl.$^5$ .............. B01J 21/04; B01J 21/06; B01J 23/10; B01J 23/64; B01J 23/89
[52] U.S. Cl. .................. 502/251; 502/302; 502/303; 502/304; 502/324; 502/326; 502/327; 423/213.5
[58] Field of Search ............ 502/251, 302, 303, 304, 502/324, 326, 327; 423/213.5

[56] References Cited

U.S. PATENT DOCUMENTS

| | | | |
|---|---|---|---|
| 3,397,154 | 8/1968 | Talsma | 502/324 |
| 3,947,380 | 3/1976 | Whelan | 252/462 |
| 3,993,572 | 11/1976 | Hindin | 502/302 |
| 4,171,287 | 10/1979 | Keith | 502/324 |
| 4,552,733 | 11/1985 | Thompson et al. | 423/213.5 |
| 4,780,447 | 10/1988 | Kim et al. | 502/303 X |
| 4,868,148 | 9/1989 | Henk et al. | 502/302 X |
| 4,923,842 | 5/1990 | Summers | 502/303 X |

FOREIGN PATENT DOCUMENTS

| | | |
|---|---|---|
| 0115449 | 8/1984 | European Pat. Off. |
| 0119715 | 9/1984 | European Pat. Off. |
| 0171151 | 2/1986 | European Pat. Off. |
| 2555038 | 6/1977 | Fed. Rep. of Germany |
| 3608292 | 9/1986 | Fed. Rep. of Germany |
| 1010783 | 11/1965 | United Kingdom |

*Primary Examiner*—W. J. Shine

[57] ABSTRACT

H$_2$S formation by three-way catalyst is suppressed by incorporating nickel, manganese or iron oxides into an undercoat layer disposed on a substrate, such as a monolith substrate. A topcoat overlying the undercoat is comprised of a three-way catalyst material which includes one or more of platinum, rhodium and palladium as catalytic metals.

18 Claims, No Drawings

HYDROGEN SULFIDE-SUPPRESSING CATALYST SYSTEM

This is a continuation of copending application Ser. No. 07/644,697 filed Jan. 22, 1991, now abandoned, which is a continuation of Ser. No. 07/532,008 filed Jun. 1, 1990, now abandoned, which is a continuation-in-part of Ser. No. 07/116,598 filed Nov. 3, 1987 and now issued U.S. Pat. No. 4,939,113.

BACKGROUND OF THE INVENTION

1. Field of the Invention

The present invention is concerned with a three-way catalyst system useful for the treatment of exhaust gases such as automobile engine exhaust gases, and more particularly such a system which is effective for suppressing the formation of hydrogen sulfide.

2. Description of Related Art

The use of three-way catalysts to treat internal combustion engine, e.g., automobile engine, exhaust gases by substantially simultaneously treating unburned hydrocarbons, carbon monoxide and nitrogen oxides in the gases is well known. However, in many cases, these same catalysts convert sulfur compounds contained in the exhaust into hydrogen sulfide, $H_2S$, noted for its extremely disagreeable "rotten egg" odor. Without intending to be bound by any particular theory, it is believed that the presence of appreciable amounts of ceria in the catalyst is the cause of $H_2S$ generation when operating conditions go from fuel-lean to fuel-rich. Methods of suppressing formation of $H_2S$ by including cobalt, nickel, iron, manganese or rhenium in the catalytic composition itself are known. For example, U.S. Pat. No. 4,552,733 provides a three-way catalyst comprising one or more platinum group metals dispersed on a gamma alumina support, the catalyst including a base metal oxide dispersed with the platinum group metal. The base metal oxide may be nickel, iron or manganese. This catalyst is stated to have three-way capability without producing appreciable quantities of hydrogen sulfide, sulfur trioxide or sulfuric acid. However, there is some opinion, particularly in Europe, that cobalt and nickel present potential health problems, so automotive manufacturers are increasingly reluctant to use catalysts containing these metals. In other cases, the net effect of including iron, manganese or rhenium in the catalyst is considered negative by manufacturers even though significant positive effects are obtained by their inclusion. While it is known to disperse copper with catalyst materials providing three-way activity, (see, for example, U.S. Pat. Nos. 4,675,308; 4,492,770; 3,993,572; and 4,492,769), there is a potential for copper oxide to reduce the activity of a three-way catalyst, if dispersed therewith.

Co-pending, Commonly Assigned Parent Application

The above-mentioned Tauster et al. U.S. patent application No. 07/116,598 (now U.S. Pat. No. 4,939,113) discloses a catalyst system comprising a three-way conversion catalyst located in a duct means and positioned between an exhaust gas inlet and exhaust gas outlet, and having means for suppressing release of hydrogen sulfide disposed in the duct means between the three-way catalyst and the exhaust gas outlet. That is, the means for suppressing hydrogen sulfide is segregated from the catalyst by being placed downstream of the catalyst relative to the direction of exhaust gas flow through the catalyst system. The means for suppressing hydrogen sulfide comprises a monolithic refractory substrate containing a hydrogen sulfide-suppressing material chosen from the group consisting of oxides of copper, manganese, nickel and iron. The disclosure of Tauster et al U.S. Pat. No. 4,939,113, which is hereby incorporated by reference herein, shows that the combination of a TWC catalyst and metal oxide scavenger of a type described in this application provides excellent results for three-way conversion of exhaust gases while reducing $H_2S$ emissions.

SUMMARY OF THE INVENTION

In accordance with the present invention, there is provided a catalyst system comprising the following components Inlet means are provided for receiving an exhaust gas from an internal combustion engine and duct means are operably connected to the inlet means for receiving exhaust gas from said inlet means. Outlet means are operably connected to the duct means for receiving and discharging to the atmosphere exhaust gas received from the duct means. A three-way catalyst means and a means for suppressing release of hydrogen sulfide are disposed on a refractory substrate which may comprise a monolith substrate, for example a cordierite monolithic substrate, located within the duct means. The means for suppressing release of hydrogen sulfide comprises a metal oxide undercoat dispersed on the refractory substrate, the undercoat comprising one or more metal oxides selected from the group consisting of manganese oxide, nickel oxide and iron oxide and being present in an amount sufficient to suppress $H_2S$ release. The three-way catalyst comprises a topcoat overlying the undercoat, the topcoat comprising a gamma alumina support having dispersed thereon catalyst metals chosen from the group consisting of palladium, the combination of platinum plus rhodium, and mixtures of platinum, palladium and rhodium. The topcoat may optionally also include ceria, preferably bulk ceria.

In one aspect of the invention, the undercoat may additionally comprise gamma alumina which may have a surface area of at least about 50 $m^2/g$, disposed on the refractory substrate and having the metal oxide dispersed thereon.

In another aspect of the present invention at least one, but preferably both, the gamma alumina dispersed in the undercoat and that dispersed in the topcoat are stabilized with a stabilizer selected from the group consisting of ceria, baria, zirconia, lanthana, mixtures of rare earth oxides, and mixtures thereof.

The present invention also provides a catalyst system comprising the following components. Inlet means are provided for receiving exhaust gas from an internal combustion engine and duct means are operably connected to the inlet means for receiving exhaust gas from the inlet means. Outlet means re operably connected to the duct means for receiving and discharging to the atmosphere exhaust gas received from the duct means. Both (i) a three-way catalyst effective for treating internal combustion engine exhaust for conversion of unburned hydrocarbons, carbon monoxide and oxides of nitrogen contained therein, and (ii) a hydrogen sulfide suppressing means are disposed in this duct means between the inlet means and the outlet means. The hydrogen sulfide suppressing means comprises a hydrogen sulfide suppressing material disposed as an undercoat on a monolithic refractory substrate, for example, a ceramic substrate, the hydrogen sulfide suppressing material being selected from manganese oxide, nickel oxide and iron oxide, for example, being manganese oxide, and the three-way catalyst being disposed as a topcoat overlying the undercoat.

In one aspect of the invention, the three-way catalyst may comprise platinum and rhodium dispersed on a particulate gamma alumina support dispersed in the topcoat. The three-way catalyst may contain ceria, e.g., bulk ceria.

In another aspect of the invention, there is provided the aforesaid catalyst system in combination with an internal combustion engine which is maintainable at substantially stoichiometric operating conditions.

Other aspects of the invention will be apparent from the following detailed descriptions.

DETAILED DESCRIPTION OF THE INVENTION AND SPECIFIC EMBODIMENTS THEREOF

This application is directed to a catalyst system which suppresses formation of $H_2S$ in addition to converting the three classes of pollutants (hydrocarbons, carbon monoxide and nitrogen oxides) usually treated by three-way catalysts. The catalyst system of the present invention reduces or avoids the detrimental interactions experienced in many prior art approaches by segregating the $H_2S$ suppressing material in an undercoat disposed beneath a topcoat of catalyst material providing three-way catalytic activity.

The $H_2S$ suppressing material may thus be applied as an initial coating ("undercoat") on a suitable bearing material such as pellets or a monolith support, which is then covered by a second coating ("topcoat") of three-way catalyst. The resulting catalyst comprises a bearing material having thereon an undercoat of $H_2S$ suppressing material over which a topcoat of a three-way catalyst material is disposed. Interactions between the three-way catalyst and the $H_2S$ suppressing material may thus be reduced or avoided. This approach can be especially beneficial in cases wherein the $H_2S$ suppressing material is susceptible to attrition losses or has the potential to adversely interact with the three-way catalyst components. By placing the metal oxide in an undercoat which is protected by a topcoat, potential losses of metal oxides by attrition are reduced or eliminated and, when nickel oxide is used, potential environmental concerns associated with losing nickel oxide to the atmosphere by attrition are alleviated. In the practice of the present invention, oxides of iron, nickel, and manganese are capable of significantly reducing $H_2S$ levels without incurring the deleterious interaction with the three-way catalyst to which copper oxide is subject. Accordingly, with the use of suitable small amounts of one or more of the three metal oxides in the undercoat, almost total suppression of $H_2S$ can be obtained.

The catalyst system of the present invention comprises a three-way catalyst and a hydrogen sulfide suppression or control component segregated from each other to the extent that they are disposed in respective discrete layers, which layers may be in contact with each other, and which are positioned in the exhaust system of an internal combustion engine. The three-way catalyst topcoat layer may itself be either a single layer or two or more layers of catalyst material. Therefore, reference herein and in the claims to a "topcoat" overlying the metal oxide(s)-containing undercoat should be understood to encompass both a single layer catalyst topcoat and a catalyst topcoat comprised of two or more layers.

The three-way catalysts used in the system of the present invention are conventional and well known to the art. For example, such catalysts and the method of fabrication thereof are disclosed in European Patent Applications 0,171,151 and 0,119,715; U.S. Pat. Nos. 4,552,733; 4,624,980; 4,678,770; 4,677,095; 4,675,308; 4,440,874; 4,206,087; 4,171,288 and 4,171,287; and U.S. patent application Nos. 07/085,903, filed Aug. 13, 1987, now abandoned; 06/879,684, filed Jun. 26, 1986, now U.S. Pat. No. 4,727,052; and 06/880,270, filed Jun. 30, 1986, now U.S. Pat. No. 4,714,694.

In general, these catalysts comprise platinum and rhodium dispersed on support particles of a high surface area ceramic oxide, typically gamma aluminum oxide borne on a refractory substrate such as beads, pellets, or a monolithic substrate. Alumina beads are well known for the purpose as are monoliths which may be either a refractory metal oxide such as cordierite or the like or a high temperature oxidation resistant metal such as Fe-cralloy or the like. As used herein and in the claims, reference to a "monolith" or "monolithic" support means the type of support, sometimes referred to in the art as a "honeycomb" support, usually comprising a substantially cylindrical body having a plurality of fine, parallel gas flow passages extending therethrough, from one end face to another. The cylindrical body is usually circular or oval in cross section and usually contains from about 100 to 600 gas flow channels per square inch of end face area. Reference herein and in the claims to a "bulk" component, such as bulk ceria, is sometimes used to specify that the component is in the form of fine particles of the material, which particles are substantially insoluble or only slightly soluble in the liquid media used to prepare the catalyst. The term "bulk" is thus intended to specify that the component involved is introduced as solid particulate components, as distinguished from the case in which such components are introduced into the catalyst as a solution of a soluble salt. For example, in contrast to being introduced as a bulk component, ceria may be dispersed in the catalyst composition by impregnating other components, such as the alumina support, with a solution of cerium nitrate which, after drying and calcination, will yield cerium oxide (ceria) dispersed in the catalyst. The precious metal catalyst components such as platinum and rhodium are dispersed on their supports by impregnation of a solution of a salt or complex of the metal.

In some cases, three-way catalysts may be fabricated using palladium instead of, or in addition to, platinum and rhodium, even though the poison resistance of palladium seems to be somewhat lower than that of platinum. Reference to "three-way catalysts" herein and in the claims has the usual meaning of catalysts, such as those described in the aforesaid patents and applications, which are capable of treating gases such as internal combustion engine exhaust gases to substantially simultaneously oxidize hydrocarbons contained therein to $H_2O$ and $CO_2$, oxidize carbon monoxide contained therein to $CO_2$, and reduce nitrogen oxides contained therein to nitrogen. In conventional practice, as is well known to those skilled in the art, the attainment of such substantially simultaneous oxidation and reduction requires that the engine whose exhaust gas is being treated be operated at or close to a stoichiometric ratio of fuel to air.

The H$_2$S suppressing component used in the catalyst systems of the present invention comprises an H$_2$S suppressing material chosen from the group consisting of manganese oxide, nickel oxide and iron oxide and dispersed on a suitable bearer material such as a monolithic substrate. The H$_2$S suppressing material may be dispersed on a high surface area support such as gamma alumina. As used herein and in the claims, the term "gamma alumina" is used to refer to high surface area catalytically active forms of alumina which often include other high surface area alumina phases such as eta, theta and delta alumina. Thus, the term "gamma alumina" as used herein and in the claims does not exclude the presence of other alumina phases. The high surface area support means particles are in turn dispersed on the substrate as an undercoat. Alternatively, the H$_2$S suppressing material may be dispersed directly on a monolith, or it may be dispersed upon a monolith to which a gamma alumina support coating has been previously applied, or it may be dispersed onto gamma alumina particles which are then applied as a coating to the monolith. In any case, the H$_2$S suppressing material is applied to the monolith as an undercoat over which a topcoat of a three-way catalyst material is dispersed. Consequently, the H$_2$S suppressing material and the three-way catalyst material are applied as discrete, separate coatings or layers thereby segregating physically the two classes of materials.

The H$_2$S suppressing material may be applied as a dispersion of either the metal or its oxide in powder form in a volatile liquid optionally containing a surfactant to aid in maintaining dispersion, or as a soluble salt of the metal, or as particles of some other compound of the metal which may be easily converted to the oxide such as by calcination or the like. In preferred embodiments, the H$_2$S suppressing material is impregnated upon particulate stabilized gamma alumina by wetting the gamma alumina with an aqueous solution of a soluble salt of the metal to about incipient wetness, drying and calcining lightly to fix the oxide on the gamma alumina. Subsequently, the impregnated gamma alumina is dispersed to form an aqueous slip or gel which is applied as an undercoat layer to the monolith which is to bear the H$_2$S suppressing material. The three-way catalyst material is subsequently applied as a topcoat layer. Alternatively, uncoated monolithic supports may be dipped in a solution of a soluble salt of hydrogen sulfide suppressing material as, for example, an aqueous solution of nickel nitrate or of manganese nitrate. This monolith, having the solution applied thereto, is then calcined to provide a coating of, e.g., nickel oxide or manganese oxide thereon. The procedure is repeated as often as necessary to build up a desired thickness of metal oxide on the monolith. Alternatively, the bare monolith may be coated with a slurry of particles of the H$_2$S-suppressing metal oxide, such as a slurry of bulk nickel oxide or bulk manganese oxide. A binder such as alumina particles may be added to the metal oxide slurry to help bind the metal oxide particles to the bare monolith. Other refractory material particles may be added to the slurry, such as crushed cordierite, to enhance porosity of the resultant undercoat. When the desired amount of metal oxide layer of H$_2$S suppressing material has been deposited on the monolith, a topcoat of three-way catalyst material is applied thereover using any suitable coating technique, and the finished catalyst is calcined. The resultant finished catalyst is placed in the exhaust system of an automobile for use, the exhaust gases flowing through the three-way catalyst topcoat and then through the H$_2$S suppressing material undercoat. As mentioned above, the H$_2$S suppressing material can interfere with or modify the catalytic activity of the platinum group metals of the three-way catalyst materials in undesirable ways. However, by physically segregating the H$_2$S suppressing material and the three-way catalyst material into discrete layers, the interference is avoided or its deleterious effects are at least minimized.

The total amount of H$_2$S suppressing material required will vary depending upon the size and maximum speed (rpm) of the engine in connection with which it is to be used as well as the propensity of the particular three-way catalyst employed to form H$_2$S. Amounts of as little as about 0.005 grams of H$_2$S suppressing materials per cubic inch of monolith can be effective in suppressing formation of H$_2$S. Typically, a total of about 1.5 grams of H$_2$S suppressing material may be required for each liter of displacement of an engine which may be operated at speeds of up to about 6000 rpm, the amount required varying approximately in direct proportion to engine size and maximum engine speed.

Manganese oxide, nickel oxide or iron oxide or a mixture of two or more of these may be applied as an undercoat beneath a topcoat of three-way catalyst material throughout the entire catalyst in carefully controlled amounts of from about 0.01 to about 0.40 grams per cubic inch without unduly degrading the three-way catalyst activity. Sulfided H$_2$S suppressing material may be regenerated upon exposure to hot lean exhaust gases occurring during operation. The following examples are provided to more fully illustrate the invention which is, however, limited only by the appended claims. The following abbreviations are used: "TWC" is used for "three-way conversion", "g" for grams, "ml" for milliliter, "m$^2$/g" for square meters per gram, "g/in$^3$" for grams per cubic inch of catalyst volume, "A/F" for air to fuel weight ratio, "lambda" for the ratio of the actual to stoichiometric A/F, and "ppm" for parts per million by weight.

TWC Catalyst Preparation I

A. Unstabilized alumina and ceria are impregnated with platinum as monoethanolamine platinum hexahydroxide as follows. Six hundred g of gamma alumina having a surface area of about 150 m$^2$/g is combined with 500 g of deionized water. After ball milling the combined ingredients for about ten minutes, 11.75 g of platinum as a monoethanolamine complex in 125 ml of deionized water is added. Ball milling is continued for an additional 20 minutes before adding 230 g of ceria having a surface area of about 180 m$^2$/g. Seventy-four g of acetic acid in 175 g of deionized water is then added to the ball mill, after which ball milling is continued until 90% by weight of the particles are reduced to a size of less than about 9 microns. The resulting slurry of about 51% solids is applied to a monolith to result in a final solids weight gain of about 1.8 g/in$^3$ after being dried at 120° C. for 2 hours and calcined at 400° C. for about 20 minutes.

B. Unstabilized alumina is impregnated with rhodium and zirconia by combining 600 g of the unstabilized alumina referred to above in this preparation with 4.50 g of rhodium in a 600 ml solution of rhodium nitrate in deionized water and 10 g acetic acid diluted to 30 ml in deionized water. The admixture is milled for thirty minutes, then 700 g of zirconyl acetate solution containing 20% ZrO$_2$ by weight and 42 g of acetic acid diluted to 125 ml are added to the slurry which is then milled until 90% of the particles by weight are reduced to a size of less than 6 microns. The resulting slurry having a solids content of about 36% by weight is applied to the coated monolith obtained in Part A of this preparation, to result in an final solids weight gain of 0.60 g/in$^3$. The monolith is then dried at 125° C. for 2 hours and then calcined at 400° C. for 29 minutes. The apparent solids weight gain of the monolith after calcination at 400° C. will exceed 0.6 g/in$^3$ as the zirconyl acetate is not completely decomposed until about 550° C.

The resulting catalyst contains, in two layers, a total nominal loading of 40 g/ft$^3$ of platinum group metal. The platinum group metal loading comprises Pt and Rh in a 5Pt:1Rh weight ratio. This catalyst is referred to as TWC-I.

TWC Catalyst Preparation II

Platinum in the form of a soluble monoethanolamine complex in distilled water was impregnated into 1000 g of a CeO2 powder having a surface area of 150 m2/g by mixing the ceria powder and the complex in a planetary type mixer to give a Pt loading of 1% by weight of the combined weight of ceria and platinum. The mixing was continued for an additional 15 minutes before the material was dried in an oven at 110° C. ad then calcined for 1 hour at 450° C. In a clean ball mill the calcined powder is added to distilled water and acetic acid (2%). After ball milling, the resulting slurry had 90% of its particles reduced in size to less than about 9 microns. This slurry was designated slurry A.

In a separate 1 gallon ball mill 1100 g of a 1.35% BaO and 1.30% rare earth oxide-stabilized alumina is milled with 1100 ml of distilled water for 5 minutes before adding the remaining Pt as a soluble platinum monoethanolamine complex. Acetic acid (5%) is added and ball milling continued until the particles are reduced in size to approximately 90% by weight being less than 9 microns. This slurry was designated slurry B.

In another ball mill a gamma alumina powder having a surface area of 90 m2/g is balled milled with a rhodium nitrate solution for approximately 30 minutes. To the ball mill is added acetic acid (5%), and ZrO2 as zirconyl acetate and the grinding is continued until 90% by weight of the particles are reduced to a size of less than 9 microns. This slurry is designated slurry C.

The resulting slurries are blended on a solids basis to give the following blend:

| Slurry Code | Material | g/in3$^{(a)}$ |
|---|---|---|
| A | Pt on CeO$_2$ | 1.00 |
| B | Stab. Al$_2$O$_3$ + Pt | 1.29 |
| C | Rh/Al$_2$O$_3$ + ZrO$_2$ | 0.60 |

$^{(a)}$Quantity of the slurry solids in the dried and calcined catalyst sample.

The coated monolith is dried at 110° C. before a final heat treatment at 450° C. for one hour. This blended slurry provides a washcoat of a total of 2.89 g/in3 loading on a 400 cells/in2 cordierite honeycomb from Corning.

The resulting catalyst contains a nominal loading of 40 g/ft$^3$ of total platinum group metal, comprising Pt and Rh in a 5Pt:1Rh weight ratio, and is referred to as TWC-II.

Test Procedure I

The Storage Test for H$_2$S was carried out by exposing the catalyst to the exhaust of an engine. The latter was operated under fuel-lean (i.e., oxidizing) conditions for approximately 30 minutes, during which time sulfur was stored, presumably as sulfate radicals, on the catalyst surface. The engine was then abruptly switched to fuel-rich (i.e., reducing) conditions, which causes a significant fraction of the stored sulfur to be emitted as H$_2$S. Storage Test results listed below were obtained by the use of Draeger tubes and indicate approximately the time-averaged H$_2$S concentration in the exhaust gas during the initial 30-second period following the switch from lean to rich engine conditions.

EXAMPLE I

Four series of test catalysts were prepared on cores of Corning 400 cordierite monolith, a support having 400 cells (passageways) per square inch of end face area.

A. A first series of TWC-II cores was prepared as in TWC Catalyst Preparation II, to serve as comparative samples.

B. A second series of cores was prepared having an undercoat of manganese oxide dispersed on alumina and a topcoat of TWC-I as the TWC catalyst. The undercoat material was prepared by placing 2000 g of gamma alumina particles having a surface area of 130 m$^2$/g in a planetary mixer together with 1300 ml of a 51.5% solution of manganese nitrate, with mixing for thirty minutes. The resulting composite material was oven dried overnight at 110° C. and then calcined at 550° C. for two hours. Seven hundred grams of the calcined material was placed in a ball mill with 14 g of acetic acid and 744 g of distilled water to yield a slurry of 48 percent by weight solids. The mixture was milled for three and one-half hours, yielding a particle size of the solids such that at least 90% by weight of the solids had a particle size of 12 microns or less. Distilled water was added to the mixture to reduce the solids to 35 percent by weight, and 35 g of alumina binder, sold as Dispersal Special 20/1 by Condea, was added to provide a 37 percent by weight solids slurry. The cores were dipped into the slurry to coat the passageways of the cores, excess slurry was blown off by compressed air, and the cores were dried at 110° C. for twenty-four hours and then calcined at 450° C. for two hours. The resultant cores had thereon an undercoat of manganese oxide dispersed on gamma alumina, at a loading of about 1.0 g/in$^3$. The washcoat comprised about 17% by weight of manganese oxide. The undercoated cores were coated with 1.66 g/in$^3$ of a catalyst topcoat by following the procedures of TWC Catalyst Preparation I, described above, to provide catalyst samples comprising an alumina-supported manganese oxide undercoat overlain by a TWC-I catalyst topcoat. These samples were designated Cores I-B.

C. The procedure of Paragraph B of this Example was employed to provide a third series of catalyst samples, except that nickel nitrate was employed instead of manganese nitrate, to produce samples having an undercoat comprising about 17% by weight nickel oxide dispersed on gamma alumina and overlain by a topcoat of TWC-I catalyst. The loading of the undercoat is about 1.0 g/in$^3$ and that of the topcoat is about 1.66 g/in$^3$. These samples are designated Cores I-C.

D. A fourth series of catalyst samples was prepared by dipping bare monolith cores into a slurry containing equal portions of manganese oxide (chemical grade HPX), ground cordierite particles and a small amount of alumina binder, drying the cores at 110° C. for two hours and then calcining the cores at 500° C. for one hour. This procedure was used to develop a coating of manganese oxide on the cores at a loading of 0.59 g/in³. The manganese oxide-coated cores then were coated with 3.00 g/in3 of a topcoat by following the procedures of TWC Catalyst Preparation II, described above, to provide catalyst samples comprising a manganese oxide undercoat overlain by a topcoat of TWC-II catalyst. These samples were designated Cores I-D.

E. A fifth series of catalyst samples was prepared by dipping bare monolith cores into an aqueous solution of nickel nitrate, drying the dipped cores at 110° C. for two hours and then calcining the cores at 500° C. for one hour. This procedure was used to develop a coating of nickel oxide on the cores at a loading of 0.18 g/in³ NiO. The nickel oxide-coated cores were then coated with 3.00 grams per cubic inch of a topcoat by following the procedures of TWC Catalyst Preparation II, described above, to provide catalyst samples comprising a nickel oxide undercoat overlain by a topcoat of TWC-II Catalyst. These samples were designated Cores I-E.

The catalysts of Example I were subjected to Test Procedure I by comparing a comparative Comp. A core to each of the cores provided in Parts B, C, D and E of Example I. Variations were made in the air-to-fuel ratio as indicated in Table I, in which the results of Test Procedure I are tabulated.

TABLE I

| | | $H_2S$ Emissions (Parts per million by weight) | | | | | | | |
|---|---|---|---|---|---|---|---|---|---|
| Run | Core | *$t_1$ | $t_2$ | $t_3$ | $t_4$ | $t_5$ | $t_6$ | $t_7$ | $t_8$ |
| 1. | TWC-II | >60 | >60 | — | 59 | 48 | — | 40 | 30 | — |
| 2. | I-B | 7 | 25 | 27 | 25 | — | 22 | 20 | — |
| 3. | I-C | 7 | 5 | 5 | 6 | 6 | 5 | 5 | 6 |
| 4. | I-D | 7 | 33 | 30 | 22 | 21 | — | — | — |
| 5. | I-E | 13 | 12 | — | 12 | — | 11 | 10 | — |

*"t" is the time in minutes after switching from lean to rich operation in Test Procedure I. The values of t in minutes are: $t_1 = 0.083$, $t_2 = 0.58$, $t_3 = 1.08$, $t_4 = 1.58$, $t_5 = 3.0$, $t_6 = 5.0$, $t_7 = 8.0$ and $t_8 = 15.0$.
In Runs 1, 2, 3 and 4, lambda (the ratio of actual to stoichoimetric air to fuel weight ratios) was 0.92, and in Run 5 lambda was 0.90, prior to switching to rich operation.

Table I shows a high degree of $H_2S$ suppression attained by the samples containing a metal oxide undercoat overlain by a TWC catalyst as compared to the layered TWC-II catalyst without the metal oxide undercoat. The $H_2S$ emissions levels when utilizing the metal oxide undercoat are as low as one-twelfth of those sustained when the metal oxide undercoat is omitted. Comparably good results were obtained both for the embodiments in which the metal oxide undercoat is supported on alumina particulate materials (Cores I-B and I-C) and samples in which the metal oxide was applied as part of a coating slurry directly to the bare monolith (Cores I-D and I-E).

EXAMPLE 2

Fresh samples of a TWC-II Core and a I-B Core were aged for 50 hours at 950° C. in a simulated fuel shut-off cycle. The aged samples were then subjected to the standard Federal Test Procedure in order to evaluate the efficacy of the catalyst in effectuating three-way conversion treatment of the test exhaust gases. The results obtained are shown in Table II in which "HC" is unburnt hydrocarbons, "CO" is carbon monoxide and "$NO_x$" is nitrogen oxides.

TABLE II

| | Emissions, Grams Per Vehicle Mile | | |
|---|---|---|---|
| Core | HC | CO | $NO_x$ |
| TWC-II | 0.25 | 1.9 | 0.35 |
| I-B | 0.30 | 2.6 | 0.40 |

Table II shows that the performance of the TWC catalyst of TWC-II and the TWC catalyst containing a MnO undercoat is substantially comparable. Although the TWC-II catalyst performed marginally better, both samples performed satisfactorily in the Federal Test Procedure and the differences between the two, at least with respect to HC and $NO_x$, are well within experimental error.

While the invention has been described in detail with respect to specific preferred embodiments, it will be appreciated that those specific embodiments do not define all the parameters of the invention, which are defined in the appended claims.

As our invention, we claim:

1. A catalyst system comprising:
   inlet means for receiving an exhaust gas from an internal combustion engine; duct means operably connected to said inlet means for receiving exhaust gas from said inlet means; outlet means operably connected to said duct means for receiving and discharging to the atmosphere exhaust gas received from said duct means; three-way catalyst means and means for suppressing release of hydrogen sulfide being disposed on a refractory substrate located within said duct means, said means for suppressing release of hydrogen sulfide comprising a metal oxide undercoat dispersed on said refractory substrate, the undercoat comprising one or more metal oxides selected from the group consisting of manganese oxide, nickel oxide and iron oxide and being present in an amount sufficient to suppress $H_2S$ release; said three-way catalyst comprising a topcoat overlying said undercoat, the topcoat comprising a gamma alumina support having dispersed thereon catalyst metals selected from the group consisting of palladium, the combination of platinum plus rhodium, and mixtures of platinum palladium and rhodium.

2. The catalyst system of claim 1 wherein said three-way catalyst further comprises ceria.

3. The catalyst system of claim 1, wherein said undercoat additionally comprises gamma alumina disposed on said refractory substrate and having said metal oxide dispersed thereon.

4. The catalyst system of claim 1, or claim 2 or claim 3, wherein said refractory substrate comprises a monolithic substrate.

5. The catalyst system of claim 4 wherein said metal oxide is manganese oxide and said manganese oxide is present in an amount of at least about 0.005 g/in³ of monolith.

6. The catalyst system of claim 1, claim 2 or claim 3 wherein at least one of said gamma alumina dispersed in said undercoat and that dispersed in said topcoat are stabilized with a stabilizer selected from the group consisting of ceria, baria, zirconia, lanthana, mixtures of rare earth oxides, and mixtures thereof.

7. The catalyst system of claim 6 wherein said gamma alumina has a surface area of at least about 50 m²/g.

8. The catalyst system of claim 7 wherein said refractory substrate comprises a cordierite monolithic substrate.

9. The catalyst system of claim 8 wherein said three-way catalyst further includes bulk ceria dispersed in said topcoat.

10. A catalyst system comprising:
inlet means for receiving exhaust gas from an internal combustion engine; duct means operably connected to said inlet means for receiving exhaust gas from said inlet means; outlet means operably connected to said duct means for receiving and discharging to the atmosphere exhaust gas received from said duct means; both (i) a three-way catalyst effective for treating internal combustion engine exhaust for conversion of unburned hydrocarbons, carbon monoxide and oxides of nitrogen contained therein, and (ii) a hydrogen sulfide suppressing means, are disposed in said duct means between said inlet means and said outlet means; said hydrogen sulfide suppressing means comprising a hydrogen sulfide suppressing material disposed as an undercoat on a monolithic refractory substrate, said hydrogen sulfide suppressing material being selected from the group consisting of manganese oxide, nickel oxide and iron oxide, and said three-way catalyst being disposed as a topcoat overlying said undercoat.

11. The catalyst system of claim 10 wherein said three-way catalyst further comprises ceria.

12. The catalyst system of claim 10 additionally comprising gamma alumina dispersed on said monolithic refractory substrate, wherein said hydrogen sulfide suppressing material is dispersed on said gamma alumina.

13. The catalyst system of claim 10, claim 11 or claim 12 wherein said hydrogen sulfide suppressing material is manganese oxide.

14. The catalyst system of claim 10, claim 11 or claim 12 wherein said hydrogen sulfide suppressing material is nickel oxide.

15. The catalyst system of claim 10, claim 11 or claim 12 wherever said hydrogen sulfide suppressing material is iron oxide.

16. The catalyst system of claim 10, claim 11 or claim 12 wherein said three-way catalyst comprises platinum and rhodium dispersed on a particulate gamma alumina support dispersed in said topcoat.

17. The catalyst system of claim 10, claim 11 or claim 12 wherein the refractory substrate is a ceramic substrate.

18. The catalyst system of claim 10, claim 11 or claim 12 wherein said three-way catalyst system further comprises bulk ceria.

* * * * *